United States Patent [19]

Hayward et al.

[11] Patent Number: 5,396,575

[45] Date of Patent: Mar. 7, 1995

[54] SEALED OPTICAL FIBER CLOSURES

[75] Inventors: Gregory P. Hayward, Palo Alto; Robert J. Naidoff, Portola Valley; David A. Horsma, Palo Alto; Lowell I. Koht, Foster City; Donald Del Fava, San Carlos; Damian Kaczorowski, San Mateo; Thomas A. Kridl, Los Altos, all of Calif.

[73] Assignee: Raynet Corporation, Menlo Park, Calif.

[21] Appl. No.: 993,946

[22] Filed: Dec. 18, 1992

[51] Int. Cl.⁶ .............................................. G02B 6/36
[52] U.S. Cl. ..................................... 385/135; 385/134
[58] Field of Search ............................. 385/134–139, 385/147, 95, 99

[56] References Cited

U.S. PATENT DOCUMENTS

| | | | |
|---|---|---|---|
| 3,429,980 | 2/1969 | Guttmann | 174/52.3 |
| 4,223,177 | 9/1980 | Nakamura | 174/52.3 |
| 4,428,645 | 1/1984 | Korbelak et al. | 385/135 |
| 4,610,921 | 9/1986 | Follette | 428/304.4 |
| 4,643,924 | 2/1987 | Uken et al. | 428/35.7 |
| 4,647,717 | 3/1987 | Uken | 174/84 C |
| 4,673,246 | 6/1987 | Schembri | 385/134 |
| 4,697,874 | 10/1987 | Nozick | 385/134 |
| 4,701,574 | 10/1987 | Shimirak et al. | 174/93 |
| 4,708,430 | 11/1987 | Donaldson et al. | 385/134 |
| 4,721,355 | 1/1988 | Gould | 385/136 X |
| 4,752,110 | 6/1988 | Blanchet et al. | 385/135 |
| 4,799,757 | 1/1989 | Goetter | 385/135 |
| 4,900,877 | 2/1990 | Dubrow et al. | 174/35 EC |
| 4,908,482 | 3/1990 | Shimirak et al. | 174/93 |
| 4,913,522 | 4/1990 | Nolf et al. | 385/95 |
| 4,917,620 | 4/1990 | Samejima et al. | 439/272 |
| 4,927,227 | 5/1990 | Bensel, III et al. | 385/135 |
| 4,936,791 | 6/1990 | Zielinski et al. | 439/271 |
| 4,958,903 | 9/1990 | Cobb et al. | 385/135 |
| 4,983,008 | 1/1991 | Campbell et al. | 385/32 |
| 5,029,958 | 7/1991 | Hodge et al. | 385/100 |
| 5,069,516 | 12/1991 | Kohy et al. | 385/147 |
| 5,093,885 | 3/1992 | Anton | 385/134 |
| 5,097,529 | 3/1992 | Cobb et al. | 385/135 |
| 5,218,664 | 6/1993 | O'Neill et al. | 385/135 |
| 5,229,924 | 7/1993 | Zell | 361/796 |
| 5,261,024 | 11/1993 | Allen et al. | 385/135 |

FOREIGN PATENT DOCUMENTS

| | | |
|---|---|---|
| 0159857 | 10/1985 | European Pat. Off. . |
| 0257999 | 3/1988 | European Pat. Off. . |
| WO90/04276 | 4/1990 | WIPO . |
| WO90/05318 | 5/1990 | WIPO . |
| WO91/07680 | 5/1991 | WIPO . |
| WO91/08574 | 6/1991 | WIPO . |

*Primary Examiner*—John D. Lee
*Attorney, Agent, or Firm*—Herbert G. Burkard

[57] ABSTRACT

An assembly capable of enclosing and sealing an intermediate section of an optical fiber includes a plurality of sealing mechanisms arranged such that the assembly can be entered to gain access to electronic components for servicing without affecting an environment occupied by optical fiber broken out of an optical fiber cable. Accordingly, physical integrity of the exposed fiber, and its associated connectors and splices, is not compromised. The assembly further includes a plurality of card cages, each of which has its own integral backplane having socket connectors which allow for connection to an adjacent card cage backplane within the assembly. During initial deployment of the assembly where less than all card cages for maximum capacity are initially required to be deployed, segmenting the backplane reduces the first installed cost of the assembly. Finally, multiple alarms are provided for the assembly to alert a central office that a cover of the assembly has been removed and a humidity level within a vicinity of the broken out fiber cable exceeds a predetermined level.

15 Claims, 6 Drawing Sheets

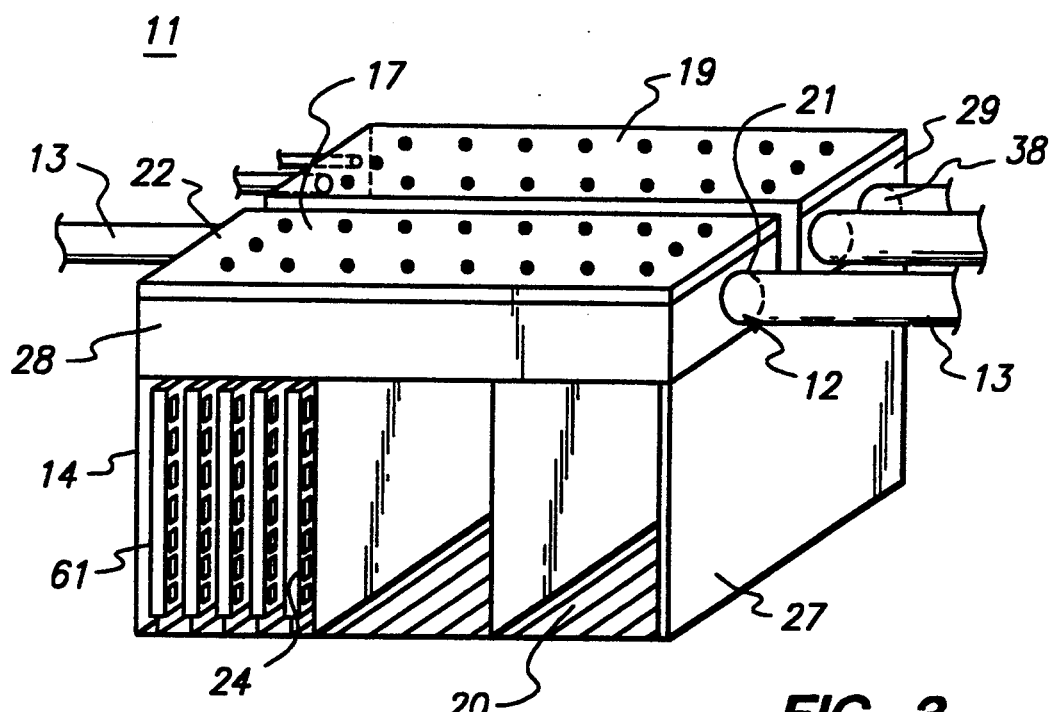
FIG. 3
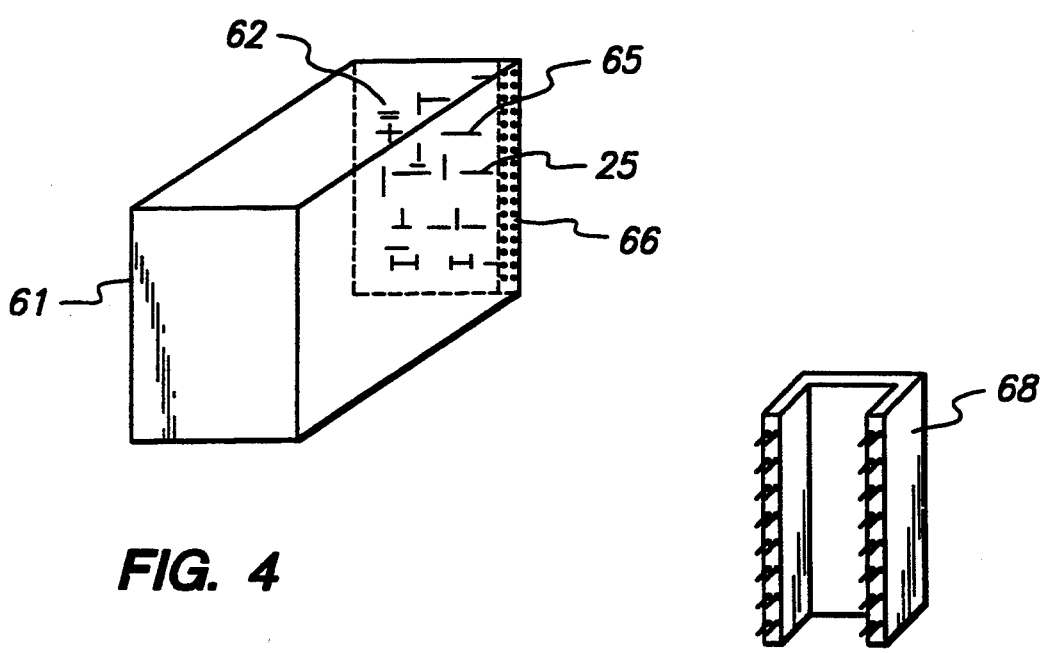
FIG. 4
FIG. 5

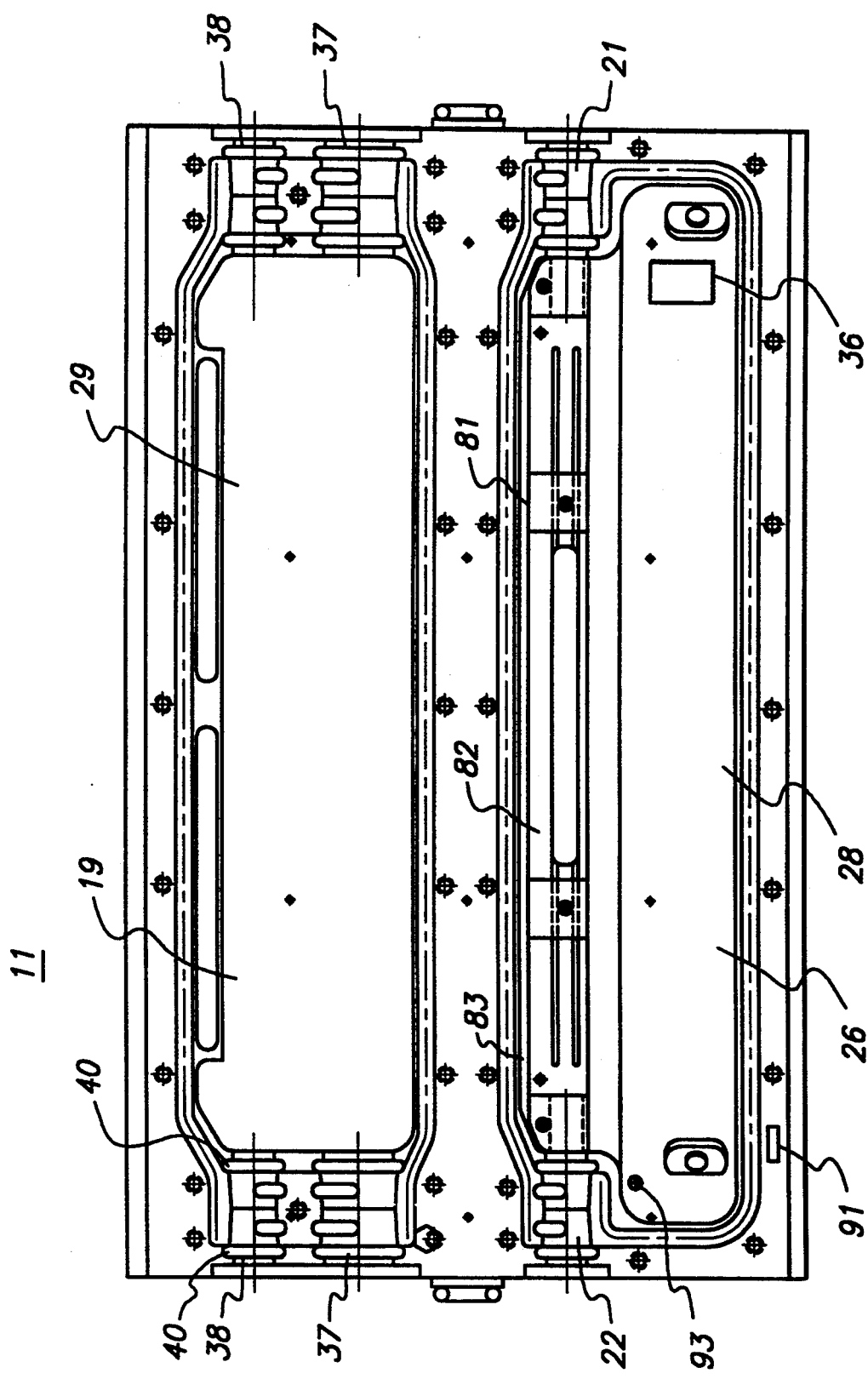

SEALED OPTICAL FIBER CLOSURES

BACKGROUND OF THE INVENTION

1. Field of the Invention

The present invention is related to sealed optical fiber closures, and in particular to closures which include an optical fiber organizer.

2. Description of the Prior Art

In recent years as deployment of optical fiber into rural and urban areas has become more prolific, an increasing need for closures which can adequately protect the fiber from the environment has increased. Koht et al. U.S. Pat. No. 5,069,516; Campbell et al. U.S. Pat. No 4,983,008; and Nolf et al. U.S. Pat. No. 4,913,522, the disclosures of which are all incorporated herein by reference, disclose various optical fiber closures which provide excellent environmental protection. However, it is oftentimes difficult to ensure that each and every entry and exit point into and out of such closures is adequately sealed, and sealing efficiency decreases if such closures are opened. Accordingly, a need exists for an optical fiber closure which provides adequate environmental protection for optical fiber even in instances when it is necessary to open a closure to achieve access to nonfiber components.

In addition, optical fiber closures utilized in fiber in the loop or fiber to the curb applications whereby fiber is deployed in close proximity to a subscriber's premises generally include electronic signal processing equipment as well as electrooptic components which are included within the closure. Since new outside construction projects are generally designed for maximum capacity far in excess of that initially required, the cost of designing such closures to enable it to support the maximum number of subscribers is rather high. Accordingly, a need exists for a closure which has a reduced installed first cost and can support the initial number of subscribers required to be serviced, and yet is capable of being accessed and reconfigured at future times to allow additional subscribers to be serviced and yet not unduly damage optical fiber being contained within the closure due to such reentrys.

SUMMARY OF THE INVENTION

It is an object of the present invention to provide an optical fiber closure which provides improved environmental protection for optical fiber, which is cost effective to install and has a low first installed cost, and which allows repeated entry for accessing non-fiber components without exposing the fiber in the enclosure to the environment. These and other objects of the invention are achieved by an assembly capable of enclosing and sealing an intermediate section of an optical fiber cable, comprising:

a closure housing and a first closure cover, the housing including an entrance and exit port through which the optical fiber cable can extend with the intermediate section of the cable between the ports being enclosed within the housing;

first means for connecting the housing and the cover to form a first environmental seal for an interior of the housing and cover;

means for processing electrical signals, the signal processing means being contained within the housing;

an optical fiber organizer for storing a plurality of optical fibers contained within the intermediate cable section;

second means, at least partially contained within an interior of the housing and the cover, for forming a second environmental seal around the optical fiber organizer and which allows the closure housing to be entered upon removal of the first cover so as to permit access to the signal processing means without breaking the second seal forming means.

Another object of the invention is to provide an assembly having a modular card cage construction to reduce costs. This object is achieved by a telecommunications closure, comprising:

a closure housing including means for holding a plurality of card cages;

a plurality of card cages insertable into the housing; each card cage including means for holding a plurality of circuit cards therein containing signal processing circuits, each card cage containing backplane means for interconnecting circuits between cards held by the card cage so as to allow communication between the cards;

means for electrically connecting the backplane means of adjacent card cages such that upon insertion of a second card cage into the closure housing its backplane is interconnected with a backplane of a first card cage already predisposed within the closure to allow communication between cards held in different card cages.

In addition, it is yet a further object of the invention to provide a fiber optic closure which has improved sensors which can indicate to a central office or other monitoring point when the closure has been opened and fiber integrity is in jeopardy. This object of the invention is preferably achieved by a telecommunications closure, comprising:

a housing for enclosing a section of an optical fiber cable, the cable entering and exiting the housing and forming a fiber breakout section therein;

first and second covers removably connectable to the housing;

means for opening and closing the first and second covers so as to permit access to an interior of the housing;

means for sensing a relative humidity within the housing in a vicinity of the fiber breakout section and for determining when the relative humidity therein exceeds a first predetermined level;

means for sensing when either the first or second covers is open;

means for generating a minor alarm when the cover means is open and the relative humidity is below the predetermined level;

means for generating a major alarm when the relative humidity exceeds the predetermined level and at least one of the covers is open.

BRIEF DESCRIPTION OF THE DRAWINGS

FIG. 3 illustrates a compartmentalized closure which utilizes the teachings of the present invention.

FIG. 4 illustrates an individual card cage pluggable into the closure of FIG. 3.

FIG. 5 illustrates a pin connector having first and second sets of electrical contact pins mateable with first and second sets of pin sockets located on adjacent edges of adjacent card cages disposable into the closure of FIGS. 3 and 6–8.

FIGS. 6–8 illustrate plan front, side, and top views, respectively, of a preferred compartmentalized closure design according to the present invention.

DESCRIPTION OF THE PREFERRED EMBODIMENT

Figure 1:
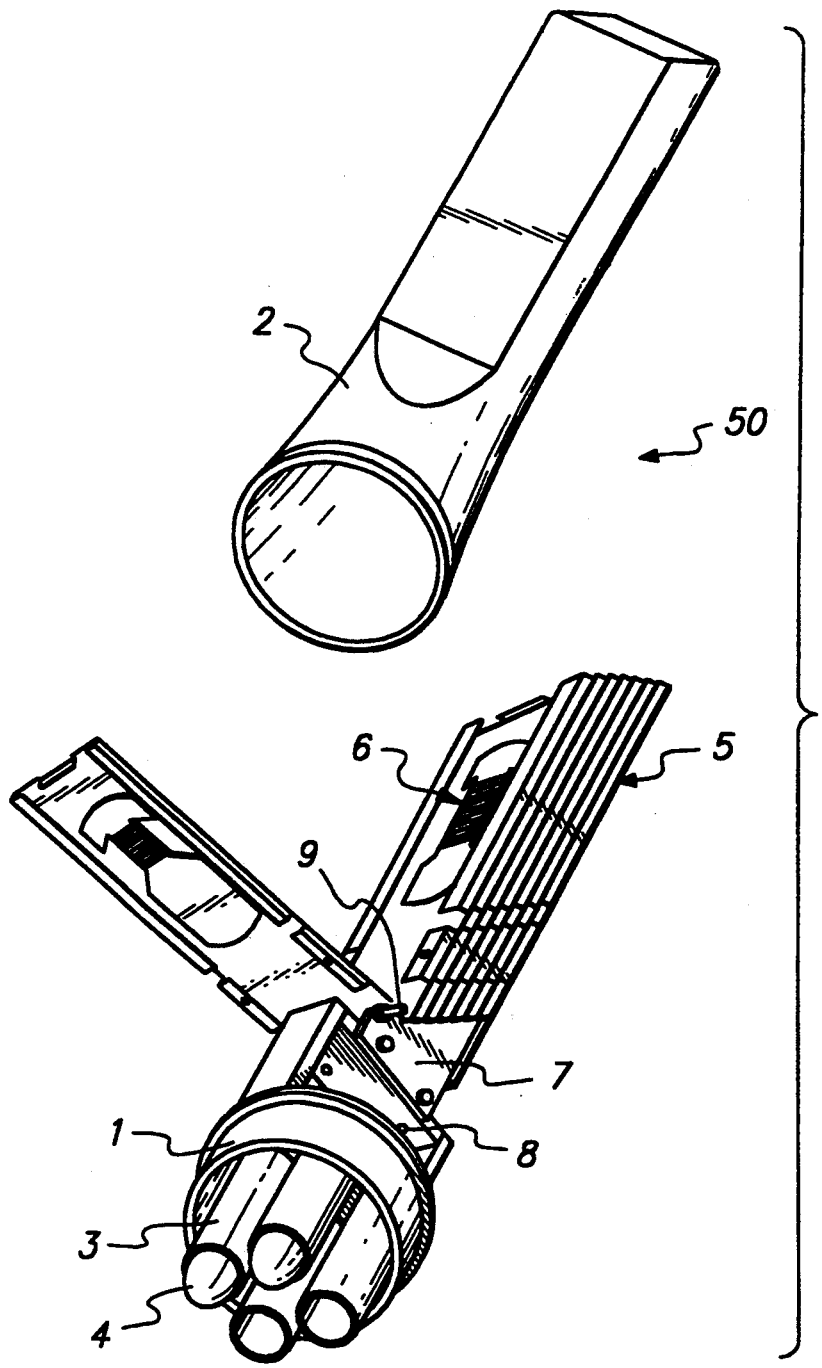
FIG. 1 illustrates a prior art butt configured optical fiber closure.

FIG. 1 illustrates a prior art optical fiber butt closure disclosed in Nolf et al., U.S. Pat. No 4,913,522 cited previously. Referring to this figure, a housing or cover 2 is secured to a base 1 so as to form an enclosure 50 which includes a plurality of optical fiber storage trays 5 having means 6 thereon for storing optical fiber connectors and splices. The storage trays 5 are secured to the base 1 via brackets 7, 8. According to this patent, the cover 2 is sealed to the base 1 using any one of a plurality of known sealing techniques. Tubes 3 through which pass an optical fiber cable and drop cables, are sealed to the optical fiber and drop cables extending therethrough via any one of a plurality of additional known techniques, thereby forming a water tight seal for the trays 5 and the splices and connectors. Tubes 3 which do not accommodate any cables are plugged using plugs 4.

Figure 2:
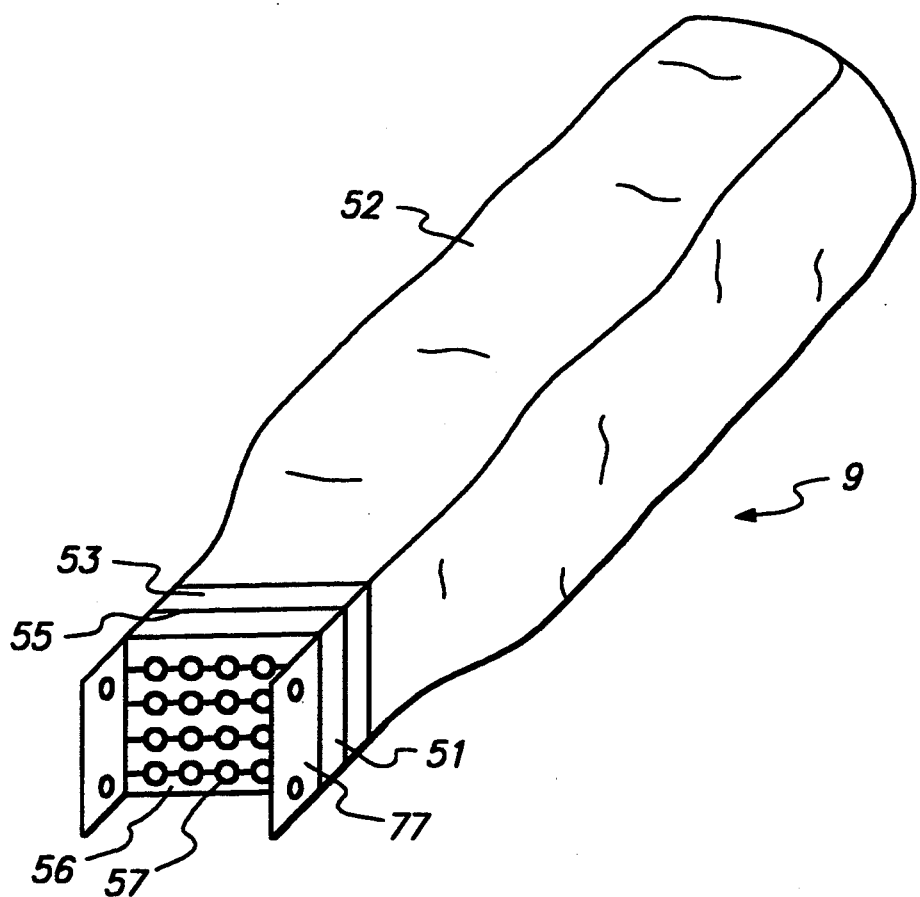
FIG. 2 illustrates a first embodiment of the invention illustrating an optical fiber tray enclosed in a water tight bag enclosure which can be deployed in the closure of FIG. 1.

According to a first embodiment of the invention illustrated in FIG. 2, means 9 are employed for sealing the trays entirely within an interior of the enclosure 50. The sealing means 9 includes a rectangular base 51 which is attached to the brackets 7 and hence connected to the trays 5. A bag, which is preferably hermetic and preferably made out of a hermetic material such as polyester film laminated to aluminum foil, has an open end 53 which is disposed around the perimeter of the rectangular base 51 and sealingly secured thereto by any appropriate means such as a tie wrap 55. The sealing means 55 could also include a resilient O-ring in which case the perimeter of the base preferably would have a cylindrical shape and/or preferably would have a groove therein for accepting the O-ring with a diameter of the groove being slightly larger than a diameter of the O-ring. In addition, an exterior surface of the perimeter of the base is preferably formed of a tacky material to promote sealing. Adhesives could also be used if desired.

As FIG. 2 indicates, the base 51 comprises a plurality of longitudinal segments 56 each of which has a plurality of semicylindrical holes on a surface thereof which oppose mating semicylindrical holes of an adjacent segments so as to form longitudinal circular holes 57 within the base. The holes 57 are sized so as to be complementary to a size of tubes or fibers extending therethrough. For example, an optical fiber to be entered has an intermediate section thereof disposed within the enclosure 50 by being passed through the tubes 3. Within the enclosure 50, the cable is entered and fibers therein are taken out. Typically, the fibers are contained within loose tubes, and hence the loose tubes would extend through the holes 57 and be sealingly secured thereto. Alternatively, if the cable is of the type not employing loose tubes, the bare buffered fibers could be taken out of the fiber cable and inserted through the holes 57, which in this example would be much smaller and preferably would be formed by simply making the segments out of a resilient material. Hence "holes 57" are formed by simply squeezing the optical fibers between adjacent segments to form an appropriate water tight seal.

According to preferred embodiments, the base segments 56 can be made out of plastic in which case an interior surface of the holes 57 are preferably coated with a tacky sealing type of material such as a gel or mastic. Alternatively, the base segments 56 could be made out of a hard rubber or hard or soft gel material, depending on the size of the base 51 and the holes 57. Appropriate rubbers, gels, and similar materials suitable for this application are readily available, some of which are described in U.S. Pat. No 4,643,924; the disclosures of all of which are all incorporated herein by reference.

According to this embodiment of the invention, since the sealing means 9 provides a water tight hermetic seal for the optical fibers, their splices, and their connectors, seals for sealing the enclosure cover and base, and seals for sealing the tubes 3 and cables passing therethrough do not need to be water tight and can simply be water resistant, and hence cheaper. In addition, water which resides in a fiber optic cable between cable sheaths, which cannot be prevented from passing into the enclosure 50 by a seal which seals around an exterior of the cable, is positively prevented from coming in contact with optical fibers, their splices and connectors since the holes 57 seal to an exterior of the tubes containing the fibers or the fibers themselves. According to a preferred embodiment, the base 51 and bag 52 are made out of hydrocarbon resistant materials.

Though FIG. 2 illustrates the use of five adjacent segments 56, it should be readily apparent that as few as two segments 56 could be employed for applications where only one fiber tray is utilized, as is a preferred embodiment for the assembly of FIGS. 3, 6–8. Such applications where a minimum number of trays are required are numerous. In particular, in fiber to the curb or fiber in the loop applications where fiber is being deployment in close proximity to subscribers, associated electronic, power, and copper components need to be enclosed, such as disclosed in the Koht patent cited previously. In such applications, the single or plural trays if utilized can be separately sealed from other components such as microprocessors, power and drop cables and cross-connect equipment, etc. thus providing a closure whereby ready access to an interior of the closure is achieved to accomplish any one of a number of functions such as insertion or removal of electronics, manipulating cross-connects, etc. without jeopardizing the integrity of optical fiber exposed from its protective cable sheath. A preferred application of the invention in such an outside plant closure, preferably functional as an optical network unit, is illustrated in FIGS. 3, 6–8.

Referring to FIG. 3, an optical network unit assembly 11 is capable of enclosing and sealing an intermediate section 12 of an optical fiber cable 13. The assembly includes enclosure housing 14 and a first closure cover 16 (FIG. 6) for sealing a front of the closure housing 14. The housing 14 includes first and second adjacent housing sections 27, 28, along with a third housing section 29 which, according to a preferred embodiment, has identical environmental sealing characteristics as that existent in the first section 27, i.e., wires and cable freely extend between the sections 27, 29 without any environmental seals being disposed therebetween. A second cover 17 provides an environmental, preferably water tight, seal over a top portion of the second housing section 28, and a third cover 19 seals a top surface of the third housing section 29.

As FIG. 3 illustrates, an interior 20 of the first housing section 27 is divided into a plurality of segments, three in the embodiment illustrated, with each segment being configured so as to be able to receive removable card cages 61 therein. Each card cage 61 is configured so as to be able to hold a plurality of circuit cards 63 therein, with each circuit card performing any one of a number of desired electronic functions, such as signal processing (electronic or optical), alarm generation and transmission, etc. In essence, one or more drop optical fibers extracted from the fiber cable 13 in the second housing section 28 carries telecommunication signals, such as data, voice, and/or video, and such optical signals are detected, processed, and transmitted either optically or preferably electrically from the assembly 11 to subscribers via drops which exit and enter drop ports 38 in the third housing section 29. The signals preferably include telephone voice signals and CATV video signals. Typically, the assembly 11, when deployed in a fiber in the loop or fiber to the curb application, is typically situated within a few hundred feet of all subscribers it services, preferably less than 200 feet, and hence the drop cables can oftentimes comprises coaxial cables, for video, and twisted wire pair cables for telephone voice signals, since over such short distances distortion induced by distance is minimal and bandwidth available is accordingly very large.

As FIG. 4 illustrates, each card cage 61 contains a backplane 62 which contains a plurality of electronic components 25 and a plurality of communication traces 65. As is well understood in the art, the backplane functions to allow communication between cards or components connected thereto. As FIG. 4 further illustrates, the backplane includes a socket connector 66 at one edge thereof, the right edge in the embodiment illustrated. When such a card cage is disposed within the closure housing 14 adjacent to another card cage having a socket connector 66 disposed on its opposite edge (i.e. left edge) so as to be adjacent to the other socket connector, the two backplanes are easily interconnectable by utilizing a dual pin connector 68 of the type illustrated in FIG. 5. This aspect of the invention is advantageous since, during initial installation of telecommunication systems, oftentimes far fewer subscribers are serviced than that for which the outside plant has been designed. Accordingly, during initial installation, in the event less than one-third of the maximum number of subscribers will actually be initially served by the assembly 11, only one-third of the card cages 61 need be utilized, with one of those card cages serving as a master card cage capable of performing all essential functions required at any assembly 11, such as packet assembly, packet disassembly, electrooptic functions, clock and phase acquisition, clock generation, etc. Thereafter, as service needs increase, additional card cages 61 can be inserted into the optical network unit, with the additional backplanes interconnected utilizing the dual pin connectors 68, with the additional card cages constituting slave card cages for the master card cage. Accordingly, initial installed expenses are drastically reduced since a size of the backplane initially deployed is limited as well as the size of the card cage itself.

Figure 6:
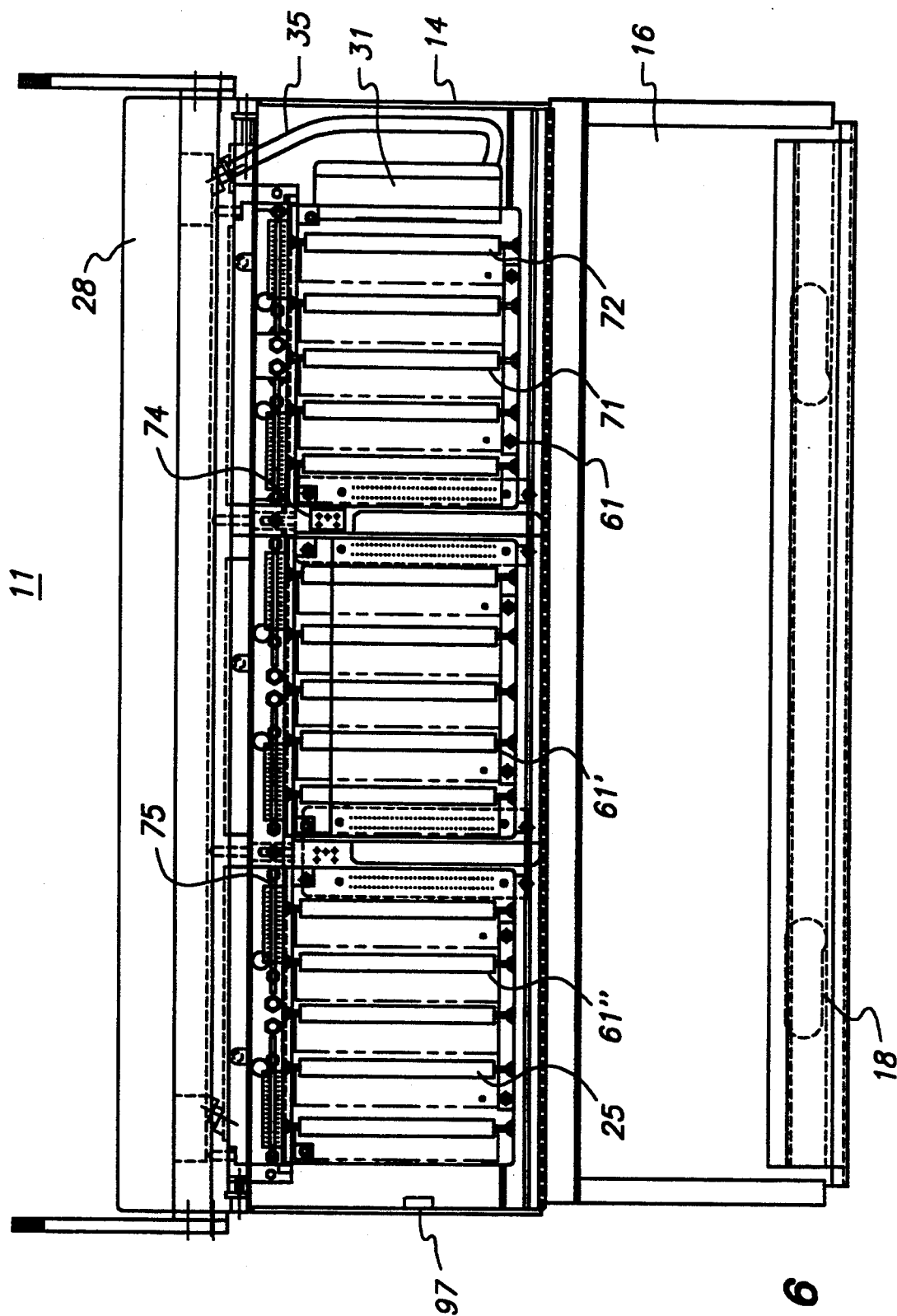
Figure 7:
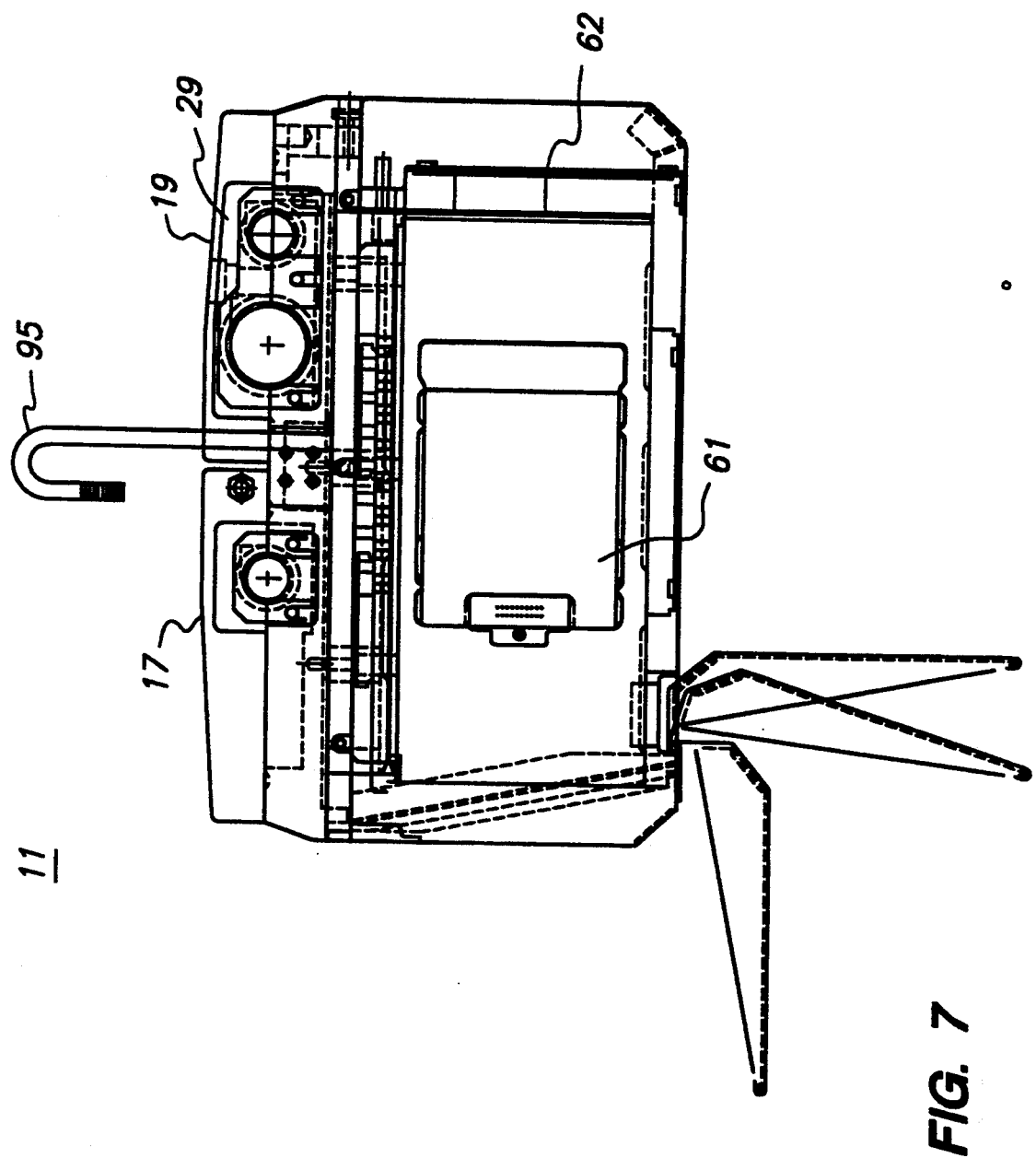

FIGS. 6–8 illustrate plan front, side, and top views of details of a preferred optical network unit constructed according to the teachings of the present invention. Referring to FIG. 6, a master card cage 61, illustrated in the far right side of the optical network unit, includes a plurality of line cards 71 as well as a packet assembly/disassembly card 72. The line cards 61 perform analog-to-digital and digital-to-analog conversions and associated electronic processing functions, well familiar to those skilled in the art, and the card 72 performs packet assembly disassembly functions on a data stream initially detected from optical fibers being accessed by the optical network unit. Accordingly, as is well understood in the art, the card 72 is capable of performing all packet assembly disassembly functions for the entire ONU (including clock and phase functions, etc.), and is not required to be duplicated by the slave card cages 61' 61'' also illustrated in FIG. 6.

The first closure cover 16 is detachably mated with the front of the closure housing 14 via a latch 18 and is hingeably connected to the closure housing 14 to provide easy convenient access to an interior thereof. According to a preferred embodiment, a surge protector 74 is provided for surge protection for the assembly 11 from a power cable servicing the optical network unit, and each card cage contains subscriber surge boards to provide electrical protection from power surges originating from subscriber drop lines.

According to a preferred embodiment, the second housing section 28 includes at least one fiber storage tray 26 (FIG. 8) as well as a desiccant 36 to maintain a controlled low humidity within an area containing the optical fiber cable which is broken into and from which drop optical fibers are accessed for extracting signals from and injecting signals into the drop optical fibers. As previously discussed, depending on the requirements of the assembly 11, a single storage tray 26 may be sufficient, or multiple stacked trays 26 may be utilized. These trays and fibers organized thereby can be secondarily protected by a secondary water tight seal of the type disclosed in FIG. 2, as previously discussed. An optical signal, obtained from the fiber cable, can be transported directly to the master card cage in protective tube 35.

However, according to an alternate embodiment illustrated in FIG. 6, the sealing means of FIG. 2 is not used. Rather, an umbilical optical fiber is preinstalled in the housing section and is contained within an environmental leak proof tube 35. The umbilical fiber is connected to one or more of the fibers broken out from the fiber cable. The preinstalled umbilical fiber and its tube extend through a wall of the housing section 28 and into the housing section 27 with a water tight seal being provided at this wall around the tube. An opposite end of the umbilical fiber is mateable with electrooptic transducers located in a water tight sealed module 31. The transducers hence can be located very close to microprocessors on circuit cards which will detect, filter and process telecommunication signals. The protective tube 35 is sealed where it enters the module 31. Accordingly, it will be appreciated by those skilled in the art that the module 31, tube 35, second housing section 28 along with its common wall with the first housing section 27, and second cover 17 together form a water tight seal for an environment occupied by the optical fiber cable intermediate section and drop fibers obtained therefrom, as well as the electrooptic transducers and umbilical fiber. Accordingly, when it is necessary for a craftsperson to open the optical network unit and either insert or remove line cards, repair any non-fiber components, or do any kind of inspection to these elements, the first closure cover 16 can be opened without affecting in any manner the environment of the intermediate section of the optical fiber and its drop fibers and connectors. Accordingly, the physical integrity of the fiber, splices, connectors, and other components associated therewith is positively preserved.

FIGS. 7 and 8 illustrate detailed aspects of the third housing section 29. This section includes first and second power ports 37 and first and second drop ports 38 into which a power cable and a drop cable or a plurality of drop cables can enter and exit respectively. Each port 21, 22, 37, 38 has a plurality of O-rings 40 with mastic being provided between the O-rings for sealing to an exterior surface of the cable passing within the seals in ports 21, 22 being water tight. FIG. 8 illustrates a center bracket 81, fiber clamp 82, and corner bracket 83 whose function is to clamp exterior sheaths of the fiber cable and provide strain relief.

Two hooks 95 are provided for suspending the assembly 11 from a telephone wire, with an opening of each hook being opposite to one another.

Another feature of the invention is the provision of first, second, and third sensors 91–93. The first sensor 91 senses when the second cover 28 is attached to or removed from its housing section as illustrated in FIG. 8, the second sensor 92 illustrated in FIG. 6 senses when the first cover 16 is open or shut, and the third sensor 93 illustrated in FIG. 8 senses when a relative humidity within the second housing section containing the optical fiber cable exceeds one or more predetermined levels. According to a preferred embodiment, activation of sensors 91, 92 trigger a minor alarm at an appropriate monitoring point, such as the telephone central office, to alert personnel that one of the optical network unit covers has been opened. Such an alarm typically would be classified as minor since it is possible that a craftsperson could be working on the optical network unit, and the alarm classification could be appropriately changed depending on the time interval it is activated. Similarly, the third sensor 93 illustrated in FIG. 8 which senses relative humidity generates a minor alarm when the relative humidity within the second closure section exceeds a predetermined level, since such a condition though requiring correction does not require correction urgently. However, according to the invention, if the third sensor activates its alarm in conjunction with either the first or second sensor, a major alarm is optionally generated since that could signify that the closure assembly is open and water is rapidly corrupting the intermediate section of the fiber cable. Such a minor alarm/major alarm is implemented by interconnecting the first and second sensors 91, 92 with an OR logical gate and inputting the resultant logical condition into an AND logical gate in conjunction with an input from the third sensor 93.

Though the invention has been described by reference to an optical fiber storage and breakout enclosure and an optical network unit, it should be readily apparent that the invention has utility in various additional applications and is not to be limited thereby but only by the appended claims.

What is claimed is:

1. An assembly capable of enclosing and sealing an intermediate section of an optical fiber cable, comprising:

a closure housing and a first closure cover, the housing including an entrance and exit port through which the optical fiber cable can extend with the intermediate section of the cable between the ports being enclosed within the housing;

first means for connecting the housing and the cover to form a first environmental seal for an interior of the housing and cover;

means for processing electrical signals, the signal processing means being contained within the housing;

an optical fiber organizer for storing a plurality of optical fibers contained within the intermediate cable section;

second means, at least partially contained within an interior of the housing and the cover, for forming a second environmental seal around the optical fiber organizer and which allows the closure housing to be entered upon removal of the first cover so as to permit access to the signal processing means without breaking the second seal forming means.

2. The assembly of claim 1, the second seal forming means forming a water tight environmental seal.

3. The assembly of claim 2, the first seal forming means forming a nonwater tight seal.

4. The assembly of claim 2, the second seal forming means being entirely disposed within the interior of the housing and the cover.

5. The assembly of claim 4, the second seal forming means comprising a base plate connected to the optical fiber organizer, optical fibers contained within the intermediate cable section being contained within tubes and accessing the optical fiber organizer by extending through holes in the base plate, the second means further comprising a hermetic bag having an open end sealingly secured around a perimeter of the base plate as well as means for sealing exterior surfaces of the tubes with interior surfaces of the holes.

6. The assembly of claim 1, the housing including first and second adjacent housing sections, the first housing section including the signal processing means, the second housing section containing the ports and including the optical fiber organizer therein;

and further comprising a second closure cover secured to the second housing section so as to form part of the second sealing means.

7. The assembly of claim 6, the second seal forming means further comprising a water tight sealed module located within a space substantially enclosed by the first housing section and the first cover, and a tube enclosing at least one umbilical optical fiber, the tube being sealingly connected to the module and the second housing section, the umbilical optical fiber having an end connected to an electrooptic transducer within an interior of the module and an opposite end connected to at least one optical fiber of the cable.

8. The assembly of claim 6, the first housing section and the second housing section sharing a common wall.

9. The assembly of claim 6, the second housing section including drop ports through which drop cables can extend for transmitting signals between the assembly and subscribers, and further comprising a third housing cover disposed over and removable from the first housing section so as to permit access to drop connections within the first housing section without breaking the second seal forming means.

10. The assembly of claim 1, further comprising a desiccant contained within the second seal forming means for controlling relative humidity therein.

11. The assembly of claim 1, the housing including first and second adjacent housing sections joined together along confronting walls thereof, the first housing section including the signal processing means, the second housing section containing the ports and including the optical fiber organizer therein; and further comprising a second closure cover and means for connecting the second housing section and the second cover together;

the second seal forming means further comprising a water tight sealed module located within a space substantially enclosed by the first housing section and the first cover, and a tube enclosing at least one umbilical optical fiber, the tube extending into the module and the second housing section and being sealingly connected to the module and the second housing section, the umbilical optical fiber having an end connected to an electrooptic transducer within an interior of the module and an opposite end connected to at least one optical fiber of the cable.

12. The assembly of claim 1, further comprising a plurality of card cages;

each card cage including means for holding a plurality of circuit cards therein containing electrical circuits for processing electrical signals, each card cage containing backplane means for interconnecting electrical circuits on cards held by the card cage so as to allow communication between the cards held by the card cage;

means for electrically connecting the backplane means of adjacent card cages such that upon insertion of a second card cage into the housing its backplane is interconnected with a backplane of a first card cage already predisposed within the housing.

13. A telecommunications closure, comprising:

first and second adjoining housing sections, the second housing section having entrance and exit ports for an optical fiber cable and being sized so as to be able to store a section of the optical fiber cable which interconnects parts of the cable extending through the entrance and exit ports;

means for connecting at least one optical fiber disposed within the cable section to an electrooptic transducer;

means for sealing the second housing section so as to provide a water tight environmental seal for the optical fiber cable section and at least one optical fiber;

means for processing electrical signals, the signal processing means being substantially contained within the first housing section and a cover secured thereto;

means for opening and closing the cover so as to permit access to an interior of the first housing section and the signal processing means therein without breaking the second housing section sealing means.

14. An assembly capable of enclosing and sealing an intermediate section of an optical fiber cable, comprising:

a closure including a base and a cover;

means for connecting the base to the cover to form a first environmental seal within the closure;

means for forming an entrance and exit port into and out of the closure through which the optical fiber cable can extend with the intermediate section of the cable between the ports being enclosed within the closure;

an optical fiber organizer disposed within the closure for storing a plurality of optical fibers contained within the intermediate optical fiber cable section;

second means, contained entirely within an interior of the closure, for forming a second environmental seal around the optical fiber organizer such that upon disconnecting the cover from the base the second seal is not broken.

15. A telecommunications closure, comprising:

a housing for enclosing a section of an optical fiber cable, the cable entering and exiting the housing and forming a fiber breakout section therein;

first and second covers removable connectable to the housing;

means for opening and closing the first and second covers so as to permit access to an interior of the housing;

means for sensing a relative humidity within the housing in a vicinity of the fiber breakout section and for determining when the relative humidity therein exceeds a first predetermined level;

means for sensing when either the first or second covers is open; means for generating a minor alarm when either the first or second covers is open and the relative humidity is below the predetermined level;

means for generating a major alarm when the relative humidity exceeds the predetermined level and at least one of the covers is open.

* * * * *

UNITED STATES PATENT AND TRADEMARK OFFICE
CERTIFICATE OF CORRECTION

PATENT NO. : 5,396,575

DATED : Hayward, et. al.

INVENTOR(S) : March 7, 1995

It is certified that error appears in the above-indentified patent and that said Letters Patent is hereby corrected as shown below:

Column 7, line 15 insert --port, the-- after the second occurrence of "the".

Signed and Sealed this

Ninth Day of May, 1995

Attest:

BRUCE LEHMAN

Attesting Officer          Commissioner of Patents and Trademarks